United States Patent
Krause et al.

(10) Patent No.: US 8,199,544 B2
(45) Date of Patent: Jun. 12, 2012

(54) ZERO-VOLTAGE SWITCHING POWER CONVERTER

(75) Inventors: Axel Krause, Nesslau (CH); Arno Mathoy, Grabs (CH); Verena Mathoy, legal representative, Grabs (CH); Anna Mathoy, legal representative, Grabs (CH); Eva Mathoy, legal representative, Grabs (CH)

(73) Assignee: BRUSA Elektronik AG, Sennwald (CH)

( * ) Notice: Subject to any disclaimer, the term of this patent is extended or adjusted under 35 U.S.C. 154(b) by 232 days.

(21) Appl. No.: 12/675,782

(22) PCT Filed: Sep. 1, 2007

(86) PCT No.: PCT/IB2007/002516
§ 371 (c)(1),
(2), (4) Date: Feb. 28, 2010

(87) PCT Pub. No.: WO2009/027758
PCT Pub. Date: Mar. 5, 2009

(65) Prior Publication Data
US 2010/0301831 A1   Dec. 2, 2010

(51) Int. Cl.
*H02M 7/5387* (2007.01)
(52) U.S. Cl. .............. 363/132; 363/17; 363/98
(58) Field of Classification Search .......... 363/17, 363/21.02, 21.03, 56.01, 56.02, 98, 131, 363/132
See application file for complete search history.

(56) References Cited

U.S. PATENT DOCUMENTS

| | | | |
|---|---|---|---|
| 5,066,900 A | 11/1991 | Bassett | |
| 5,157,592 A | 10/1992 | Walters | |
| 5,875,103 A | 2/1999 | Bhagwat et al. | |
| 5,949,669 A | 9/1999 | Bruckmann et al. | |
| 6,016,258 A | 1/2000 | Jain et al. | |

(Continued)

FOREIGN PATENT DOCUMENTS

CA   2458137 A1   5/2005

(Continued)

OTHER PUBLICATIONS

Pinheiro, J.R. et al. "Isolated Interleaved-Phase-Shift PWM DC-DC ZVS Converters," from IEEE 2000 Industry Applications Conference, Oct. 8-12, 2000, Piscataway NJ, pp. 2383-2388; ISBN: 978-0-7803-6401-1.

(Continued)

*Primary Examiner* — Jeffrey Sterrett
*Assistant Examiner* — Lakaisha Jackson
(74) *Attorney, Agent, or Firm* — George Kapsalas; Patentbuero Paul Rosenich AG (57) ABSTRACT

The zero-voltage converter is able to perform at extremely high power levels and bares significant benefits to all levels; system, inverter and circuitry level. Power losses are avoided by using a new developed resonant topology. EMI problems are reduced by power module integrated capacitors as well as smart selection of the terminal technology and under full utilization of the analog components and their potentials. The power module developed for this specific application is designed under a maxim of gaining highest power density as well as lowest stray inductances. High switching frequencies enable even special electro motors with extremely low leakage inductance to perform well. This is in particular beneficial for ultra high speed drives or motors with a high pole pair number. The mechanical concept of the inverter can specifically be adopted to the referring vehicle and to its available installation space. Thus, also (hybrid) electrical vehicles can be designed based on such highly innovative conception.

26 Claims, 5 Drawing Sheets

U.S. PATENT DOCUMENTS

| | | | |
|---|---|---|---|
| 6,590,302 | B2 | 7/2003 | Goepfrich et al. |
| 6,611,444 | B2 | 8/2003 | Ayyanar et al. |
| 6,744,649 | B1 | 6/2004 | Yang et al. |
| 7,023,718 | B2 | 4/2006 | Huang et al. |
| 7,215,040 | B2 | 5/2007 | Fang et al. |
| 2004/0125619 | A1 | 7/2004 | Yang et al. |
| 2006/0119185 | A1 | 6/2006 | Steigerwald et al. |

FOREIGN PATENT DOCUMENTS

| | | |
|---|---|---|
| CN | 1299179 A | 6/2001 |
| CN | 1540851 A | 10/2004 |
| DE | 4419111 A1 | 7/1995 |
| EP | 1458084 A2 | 9/2004 |
| EP | 1458084 A3 | 4/2006 |
| JP | H10-004686 A | 1/1998 |
| JP | 2000-224855 A | 8/2000 |
| TW | 449969 B | 8/2001 |

OTHER PUBLICATIONS

Steigerwald, R.L. et al. "A Comparison of High Power DC-to-DC Soft-Switched Converter Topologies," from IEEE 1994 Annual Conference of the Industry Applications Society, Oct. 2-6, 1994, Denver, Colorado, pp. 1090-1096; ISBN:978-0-7803-1993-6.

International Search Report and International Preliminary Report on Patentability, dated Jul. 25, 2008, from International Application PCT/IB2007/002516 published as WO2009/027758A1 on Mar. 5, 2009.

Sontheimer, P. and Mathoy, A.: "Softswing Inverters and Customized Power Modules for Leaner and Greener Operation," in Power Systems Design Europe, v.3 No. 7, Sep. 2006; pp. 14-20, Figs. 1-4.

"A novel zero-current-transition full-bridge DC-DC converter," Marx, M.; Schroder, D. 27th Annual IEEE Power Electronics Specialists Conference, 1996. PESC '96 Record. Publication Year: 1996, pp. 664-669 vol. 1.

"A novel zero-current-transition full bridge DC-DC converter," Zhang, J.M.; Xie, X.G.; Wu, X.K.; Zhaoming Qian. Twentieth Annual Applied Power Electronics Conference and Exposition, 2005. APEC 2005. Publication Year: 2005 , pp. 673-677 vol. 2.

"A simple active auxiliary commutation circuit for three-level inverters," Baggie, J.E.; Pinheiro, J.R. 23rd International Conference on Industrial Electronics, Control and Instrumentation, 1997. IECON 97. Publication Year: 1997 , pp. 716-721 vol. 2.

"A simple active auxiliary commutation circuit for three-level PWM single-phase inverters," Baggio, J.E.; Pinheiro, J.R. IEEE Transactions on Industrial Electronics, vol. 48 , Issue: 6. Publication Year: 2001 , pp. 1166-1173.

"A zero-current-switching PWM flyback converter with a simple auxiliary switch," Chung, H.S.-H.; Hui, S.Y.R.; Wei-Hua Wang. IEEE Transactions on Power Electronics, vol. 14 , Issue: 2. Publication Year: 1999 , pp. 329-342.

"An improved zero-voltage and zero-current-switching full-bridge PWM converter using a simple resonant circuit," Kyoung-Wook Seok; Bong-Hwan Kwon. IEEE Transactions on Industrial Electronics, vol. 48 , Issue: 6. Publication Year: 2001 , pp. 1205-1209.

"A ZVT Boost Converter using an Auxiliary Resonant Circuit," "Phattanasak, M. International Conference on Power Electronics, Drives and Energy Systems, 2006. PEDES '06. Publication Year: 2006 , pp. 1-6."

"Quasi-Resonant Dual Mode Soft Switching PWM and PDM High-Frequency Inverter with IH Load Resonant Tank," Ahmed, N.A.; Eid, A.; Hyun Woo Lee; Nakaoka, M.; Miura, Y.; Ahmed, T.; Hiraki, E. IEEE 36th Power Electronics Specialists Conference, 2005. PESC '05. Publication Year: 2005 , pp. 2830-2835.

ZERO-VOLTAGE SWITCHING POWER CONVERTER

CROSS REFERENCE TO RELATED APPLICATIONS

This application is a 35 U.S.C. 371 national stage entry of PCT International App. No. PCT/IB2007/002516 filed on Sep. 1, 2007; the entirety of PCT International Application No. PCT/IB2007/002516 is expressly incorporated herein by reference, for all intents and purposes, as if identically set forth herein.

FIELD OF THE INVENTION

The invention relates to a zero-voltage switching power converter, comprising an inverter, having at least two pairs of controllable switching devices, said switching devices, constitute respectively the up side and down side of a semi-bridge circuit, which is connected to an output terminal of the converter, wherein one pair of said controllable switching devices operate as main switching devices and one second pair of said controllable switching devices operate as auxiliary switching devices. The power converter should be usable as electronic commutator for electrical machines (all kinds of AC-machines and all kinds of synchronous machines), doubly fed machines such as electrically excited synchronous machines and for DC/DC converters e.g.

BACKGROUND ART

Conversion of power is performed usually in switched mode consisting of turn-on and turn-off statuses.

In semiconductor power stages the energy dissipation is essentially determined by conducting and switching losses. With increasing frequency the switching losses become dominant, since the switching process is executed much more frequently. This circumstance limits the economically achievable maximum switching frequency, which is determined by dedicating one third to one half of the total losses to switching losses. This leads to approx. 10 kHz switching frequency with state-of-the-art IGBTs of the 600V class and 4 kHz for state-of-the-art 1200V devices.

Each operation of turn-on and turn-off is completed in a limited period of time and the duration for the turn-on and turn-off status of the switching components is determined by the properties of the parts forming said converter. Each turn-on or turn-off operation will cause power consumption. The value of the switching consumption equals to the value obtained by integrating multiplication of the current flowing in the switching components by the voltage across the switching components over the duration of one turn-on or turn-off operation. Thus, the higher the switching frequency of the switching component is, the more the switching consumption becomes. Especially when the frequency is very high, such switching consumption becomes majority of the consumption and can increase the aggregate switching consumption of the switching components. Such switching consumption will cause negative influences to the switching components, increase the working temperature, the excursion of working parameters of the switching components, and will finally also waste electrical energy—which should be saved in battery operated vehicles and devices, etc.

In order to diminish this kind of switching consumption, many technologies relating to soft-switching are being developed. The working principle of these technologies is to make the current flowing through or the voltage across the switching components be zero or near zero during the turn-on and turn-off operation. In this way, the switching consumption shall be decreased accordingly. These types of soft-switching technology can only be used in DC power converters, and auxiliary circuits of such types of soft-switching are mostly of great complexity with multiple components, examples for such solutions are disclosed in e.g. U.S. Pat. No. 5,066,900; U.S. Pat. No. 6,016,258 and EP1458084.

SUMMARY OF THE INVENTION

Besides a minimum of construction volume, the target for the new inverter design was to achieve extremely low operation losses as well as a highly improved EMI (Electromagnetic Interference) performance and an increase of the possible switching frequency.

In considering these targets, a couple of design rules regarding the power electronics were considered in order to minimize the system cost, arising while ramping up the device in a mass production style manufacturing site. The system must have a low internal complexity, consequent PCB integration for passives, reduced overall dimensions as well as reduced weight regarding its components, and must be realized with an extremely low inductive design in order to enable highest current handling capability. The key target was thus a high PWM (Pulse-Width Modulation) frequency at low losses.

The newly introduced converter is based on a—preferably resonant—switching topology, which helps to reduce power losses as well as EMI effects. It is a forced electromagnetically cooperation of two inductances over a single iron core which is the basic idea of the invention. The switching of an auxiliary switch in one half of the semi bridge urges an increasing current flow in the other half of the semi bridge and thus leveling the main switching voltage to zero by assistance of diodes and eventually capacitors. This is even enhanced if a resonant behavior in the half circuits of the semi bridge is installed.

Thus, according to a first aspect of the invention there is a zero-voltage switching power converter comprising an inverter having at least two pairs of controllable switching devices, said switching devices constitute respectively the up side and down side of a semi-bridge circuit, one bridge point of which is connected to an output terminal of the converter, wherein one pair of said controllable switching devices operates as main switching devices and a second pair of said controllable switching devices operates as auxiliary switching devices; and there are inductances connected in series with each of the auxiliary switching devices, said inductances forming first and second coils being coupled and wound on a common core; the distinctive stray inductance of said inductances promotes at least nearly zero voltage switching on and switching off of said auxiliary switching devices.

Further preferred embodiments are disclosed in the following disclosure and appended drawings.

The converter according to the invention leads to better silicon usage and less electrical waste energy and to significant cost reduction in the system.

The highest reliability as well as power and current densities can be realized.

Among others, a power converter has been realized in a working example with small inductances which can be produced at constant quality levels, reverting to most actual technologies and fabrication processes.

Preferred embodiments can even re-utilize the demagnetizing energy of the inductances and feed it back to either the battery or to other useful elements, as disclosed in "Soft- Swing® inverters and customized power modules for leaner and greener operation" by Peter Sontheimer, Tyco Electronics and Arno Mathoy, Brusa Elektronik AG; in Power Systems Design Europe, 09/2006, Vol. 3, Issue 7, pp. 14 to 20, the whole content of which will be considered as a reference and is integrated into this specification by reference as well. It was published by one of the inventors within the 12 month grace period under US and other laws.

BRIEF DESCRIPTION OF DRAWINGS

These and other aspects of the invention will now be further described, by way of example only, with reference to the accompanying figures in which:

FIG. 4 shows the switching-on period of the upper main switching element.

DETAILED DESCRIPTION OF THE PREFERRED EMBODIMENTS OF THE INVENTION

The present invention regarding the current best mode apparatuses and methods for digital power conversion operating with zero voltage will be illustrated below in conjunction with FIGS. 1 to 14. However the invention as specified in the claims is not restricted by these examples of apparatuses and methods.

Figure 1:
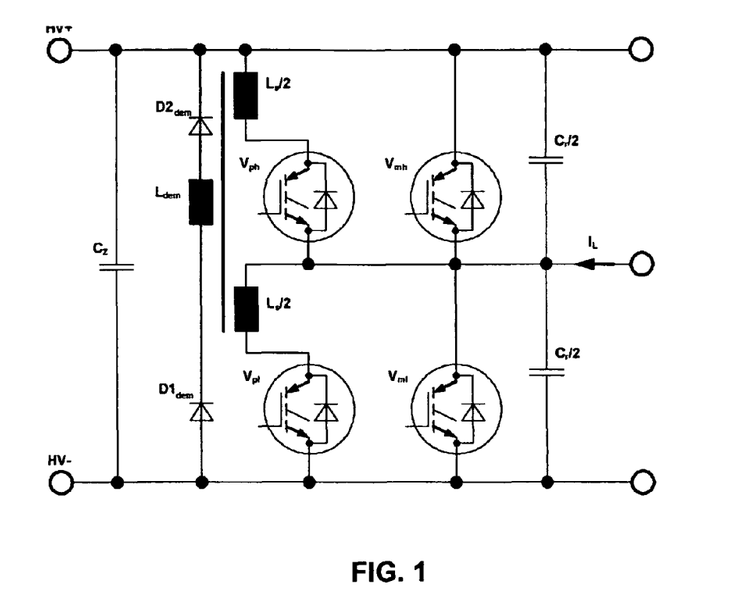
FIG. 1 is a circuit diagram showing the zero-voltage switching power converter using demagnetizing coil according to one embodiment of the present invention.

In general, the selected basic topology represents a full bridge power circuit as shown in FIG. 1. By adding a two- or three-coil transformer-choke $L_S$, as well as auxiliary capacitors $C_r$ in the circuit, a resonant inverter topology can be realized. The bridge point, formed by e.g. two main IGBTs (Insulated Gate Bipolar Transistors) as switching elements, is connected to an auxiliary circuit, consisting of small bridge capacitors $C_r$ and an auxiliary half bridge with small IGBTs and the coupled inductors $L_S/2$ on their drains. Of course, the switching elements can be realized by other semiconductor types (e.g. MOSFet's, bipolar transistors, GTO's etc.) as well known for a person skilled in the art.

As shown in FIG. 1, the new topology involves basically of one commuting transformer $L_S$, auxiliary switches $V_{ph}$, $V_{pl}$ for each half bridge, which are used for the commuting process, and one or more main-switches $V_{mh}$, $V_{ml}$ for each half bridge, which lead the actual load current.

By using the auxiliary switch concept the main switches $V_{mh}$, $V_{ml}$ can be switched on with zero-current and zero voltage. The auxiliary switches $V_{ph}$, $V_{pl}$ can be switched on with zero current due to the distinctive stray inductance of the commuting coils $L_S$. Because of the transformative commuting it can also be switched off with nearly zero-current. This makes it different to other known half bridges in the Art, utilizing only main switches and auxiliary switches but no transformative commuting inductances.

A further advantage of this topology is, that the auxiliary switches $V_{ph}$, $V_{pl}$ only have to commutate half of the load current $I_l$ since the inductances $L_S/2$ are coupled to each other. Advantageously, the inductances $L_S/2$ may be wound unidirectionally on the common core. Further advantageously, the inductances $L_S/2$ may be wound with a bifilar winding on the common core. Hence, when one auxiliary switch $V_{ph}$, $V_{pl}$ is closed, a current also begins to flow in the other auxiliary switch $V_{ph}$, $V_{pl}$ through the diode bridging the auxiliary switch. Moreover, when they are switched, the inductances $L_S/2$ reduce, due to their dynamic behavior, the load on the auxiliary switch $V_{ph}$, $V_{pl}$.

The switch-off time of the main switches $V_{mh}$, $V_{ml}$ can be reduced to a reasonable amount, because the capacitors $C_r/2$ commutate the current and therefore slow down the voltage rise.

This embodiment of the zero-voltage switching power converter according to the invention offers a variant solution for demagnetizing the commuting transformer $L_S$. As indicated, there is a further coil $L_{dem}$ arranged in close electromagnetic coupling with the upper and lower inductances $L_S/2$, said further coil $L_{dem}$, feeding the energy, which has been accumulated during the commutation process, through demagnetizing over diodes D1 and D2, resp. into the DC power supply of the inverter.

Figure 2:
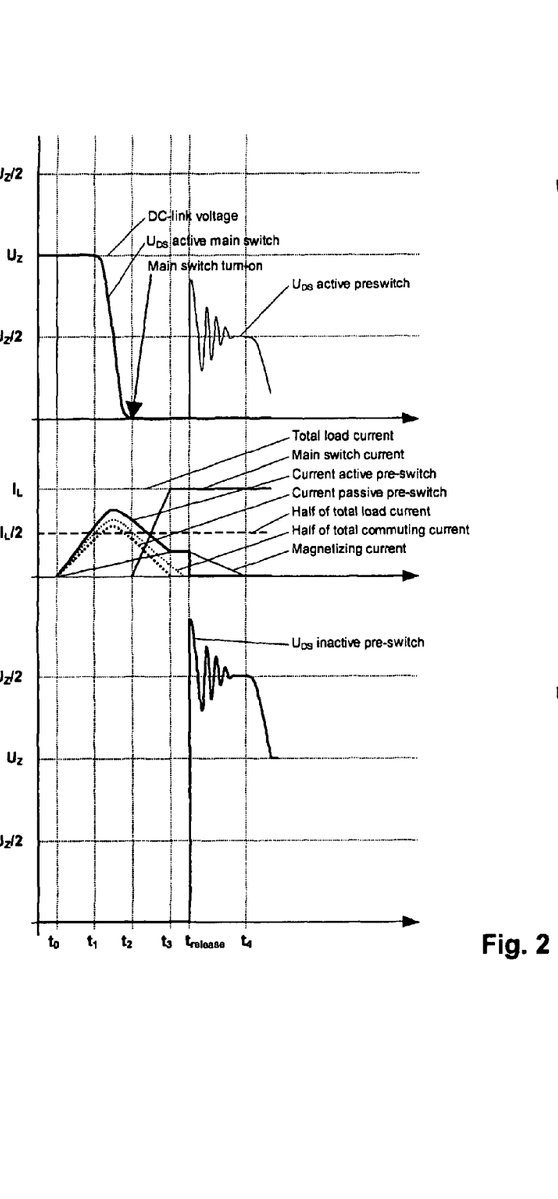
FIG. 2 shows a sequence of one switching cycle of the converter in FIG. 1.

FIG. 2 shows the switching behavior of the inverter. In case of active switch-on, the external gate stimulus turns on only the auxiliary IGBTs which conducts first ($t_0$). Now the current ramps up, determined by the inductor $L_S/2$. Due to the coupling over the common magnetic core, the same current ramps up in the other inductor $L_S/2$ through the free-wheeling diode of the passive auxiliary switch $V_{ph}$, $V_{pl}$. Once the sum of these auxiliary currents are equal to the load current Il, the main free wheeling diode is completely prevented from any load current and is about to set the bridge point free ($t_1$). Now the bridge capacitors $C_r$ and the inductors $L_S$ form an LC oscillator and the bridge voltage starts to swing around its neutral point, which is in this case the virtual center tap of the DC-link. In the preferred embodiments the damping is sufficiently low, hence the bridge voltage nearly reaches the other rail potential, where it is trapped by zero-current and zero-voltage turn-on of the corresponding main IGBT ($t_2$). From this point, the auxiliary inductors $L_S/2$ give off their stored energy as their currents start to ramp down, again determined by the inductors $L_S/2$. As the load current $I_l$ is continuously flowing, the main switch $V_{mh}$, $V_{ml}$ current must ramp in exchange of the disappearing auxiliary current. Once the load current $I_l$ is completely commuted ($t_3$), the inductors $L_S/2$ need to be demagnetized, for which the auxiliary switch $V_{ph}$, $V_{pl}$ has to be turned off ($t_4$).

One solution to perform demagnetization is formed by a well coupled demagnetizing coil as used in the embodiment shown in FIG. 1. There the demagnetizing energy is—due to the serial diodes electromagnetically only taken from the inductors Ls/2 when they ramp down. Once the auxiliary inductors $L_S$ are demagnetized ($t_5$) the half bridge is ready for another active commutation.

Figure 3:
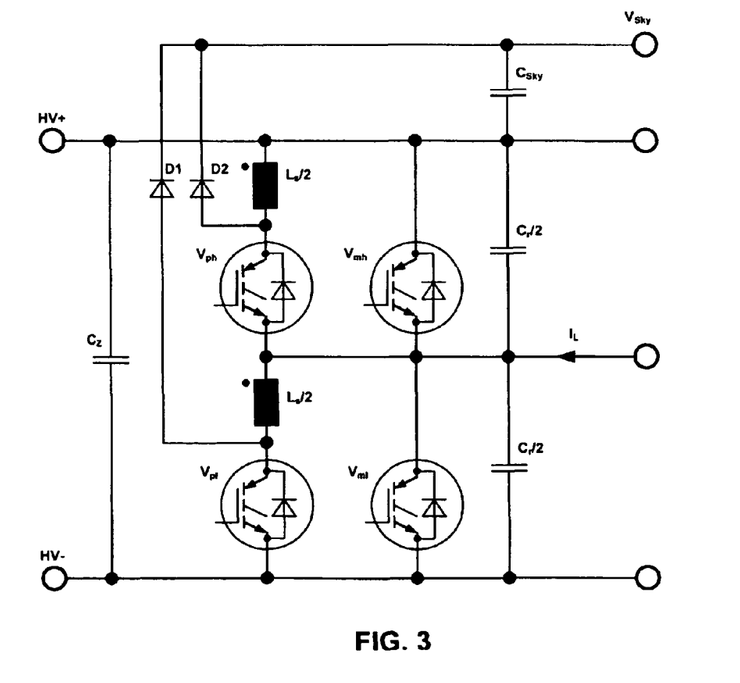
FIG. 3 shows a circuit diagram showing the zero-voltage switching power converter using sky-converter according to another embodiment of the present invention.

Other possible solution to perform demagnetization is shown in FIG. 3 by the diodes D1 and D2 which drain to a separate electrical level, said arrangement is called "sky converter" in the current description.

Figure 4:
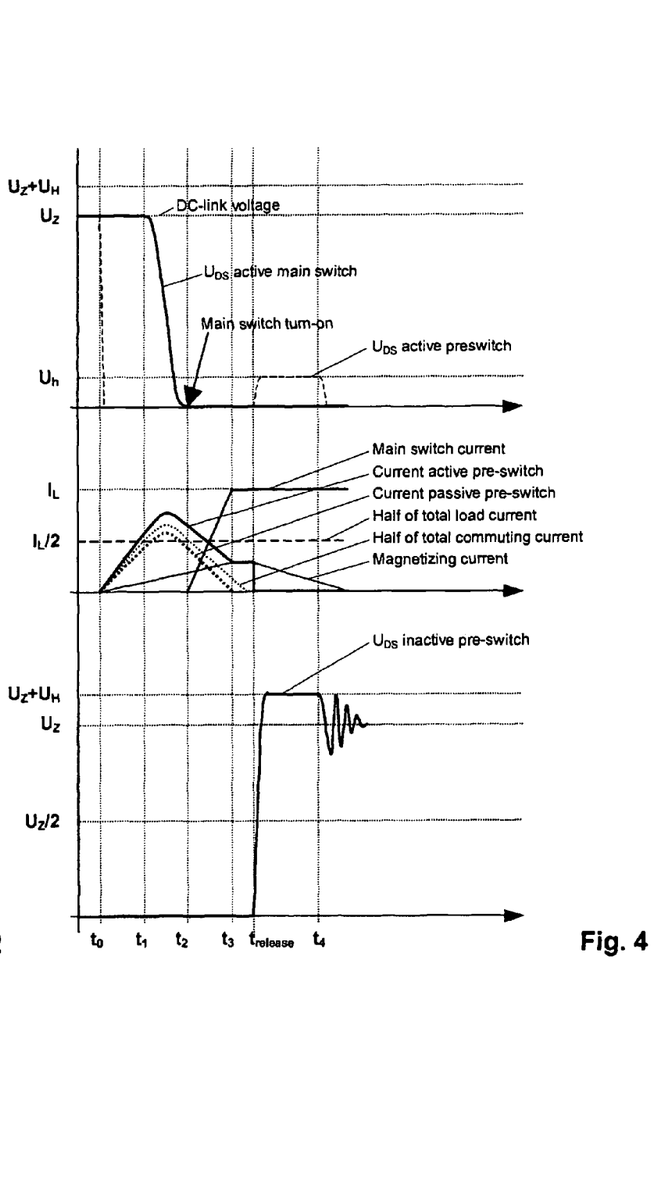
FIG. 4 shows a sequence of one switching cycle of the converter in FIG. 3.

FIG. 4 shows the switching behavior of the inverter shown in FIG. 3, similar to the diagram of FIG. 2.

Demagnetization, using the diodes D1 and D2, as shown in FIG. 3, are preferential, because in this topology the in-circuit action of the demagnetizing coil $L_{dem}$ becomes obsolete. The additional space needed and manufacturing cost of the tertiary coil $L_{dem}$, are less advantageous for converters, which are dedicated for electrical cars or the like. Further the separate electrical level can be used for feeding electronics or the like and hence it provides additional advantages.

Figure 5:
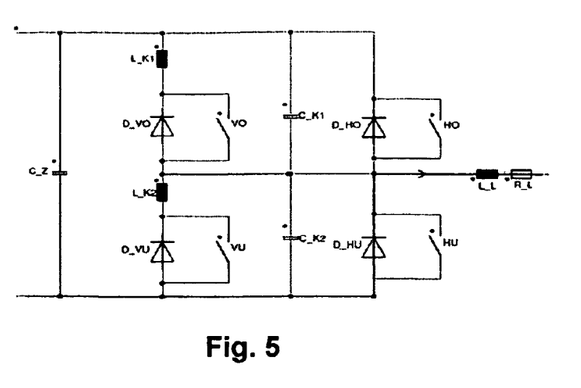
FIGS. 5, 7, 9, 11, 13 are circuit diagrams showing the current flow during the operation of the converter in FIG. 1, and FIGS. 6, 8, 10, 12 and 14 are time sequence diagrams showing switching processes of the converter for power processing operating with zero-voltage switching according to the present invention.
Figure 6:
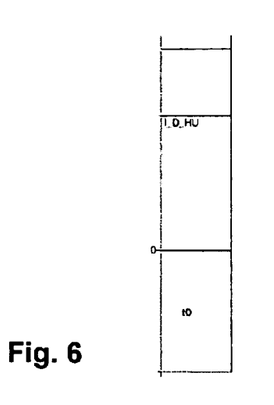
Figure 7:
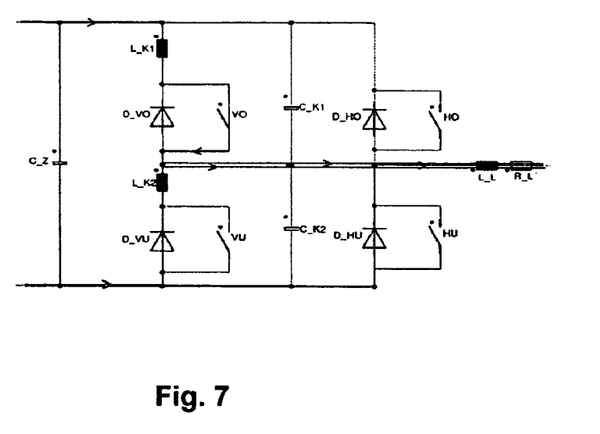
Figure 8:
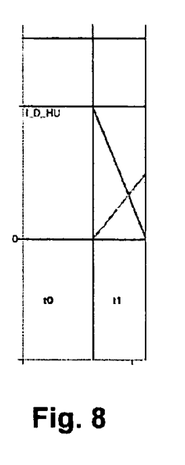
Figure 9:
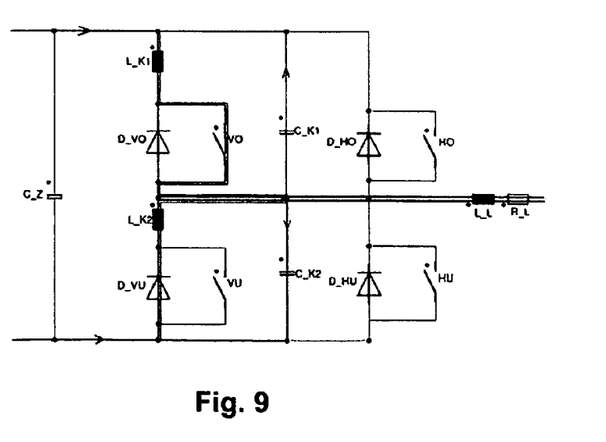
Figure 10:
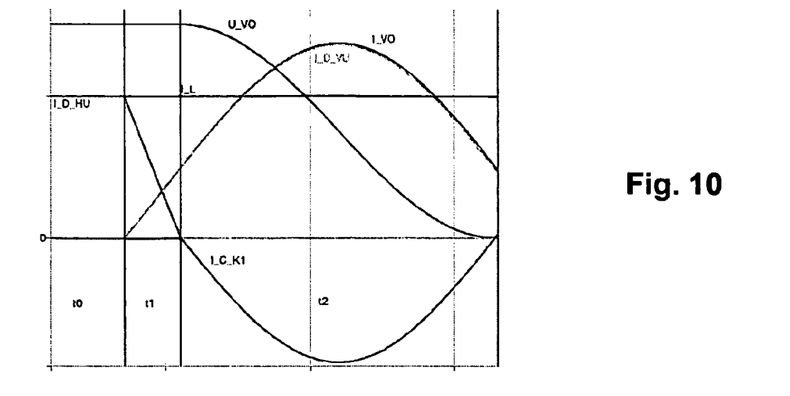
Figure 11:
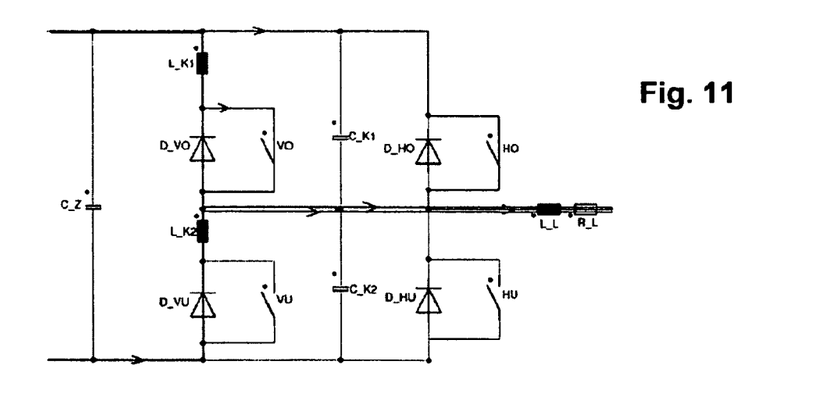
Figure 12:
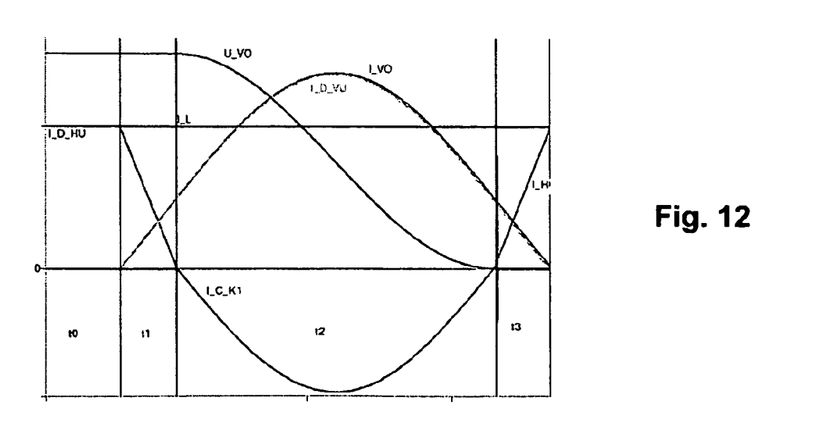
Figure 13:
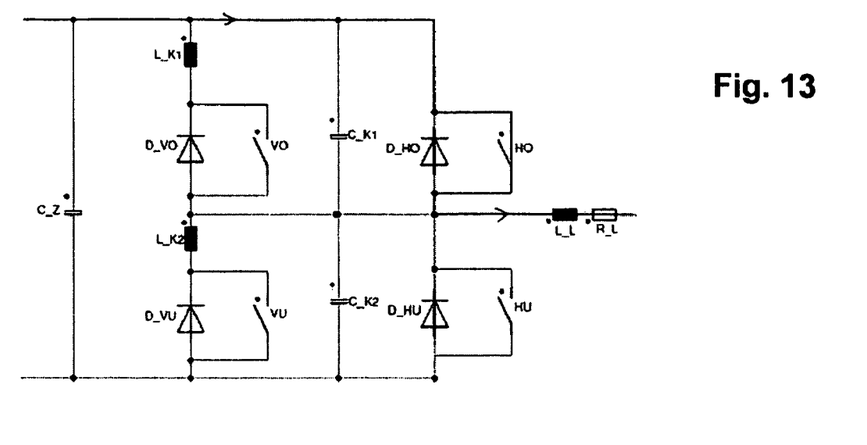
Figure 14:
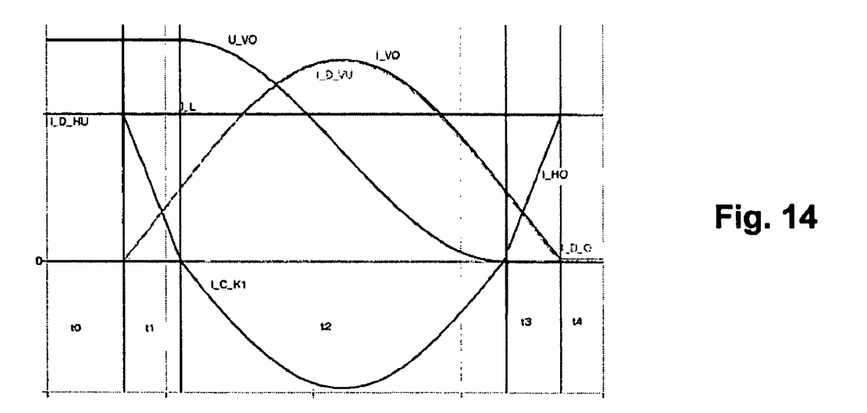

FIGS. 5 and 6 show the initial situation ($t_0$); FIGS. 7 and 8 show the situation of taking over the load current by the upper auxiliary switch ($t_1$); FIGS. 9 and 10 show the situation of activation of a resonant circuit build up by the upper inductance $L_S/2$, lower inductance $L_S/2$ and both capacitors $C_b/2$ ($t_2$); FIGS. 11 and 12 show the situation of taking over the load current by the upper main switch ($t_3$); FIGS. 13 and 14 show the final situation of demagnetizing of the commuting transformer $L_S$.

Mechanical Dimensions and Concept of the Inverter:

One important aspect regarding the module development was to achieve the lowest induction design. As of today one example of the inverter is designed in a solid Al-metal housing, whereas the housing bottom is completed as a water cooler. The outer dimensions are unrivaled small for this power level:

88×240×360 mm, max. power 106 kW ($V_{DC}$=75% $V_{DCmax}$, $I_{AC}$=$I_{ACmax}$, cos φ=0.9, in case of an 450 V inverter).

88×240×580 mm, max. power 212 kW ($V_{DC}$=75% $V_{DCmax}$, $I_{AC}$=$I_{ACmax}$, cos φ=0.9, in case of an 900 V inverter).

This leads to extreme performance key figures of 11.1 kW/kg or 13.94 kW/dm$^3$ regarding the 450 V inverter and of 14.1 kW/kg or 17.3 kW/dm$^3$ regarding the 900 V inverter.

The power module circuit was integrated in "flow 0" housing with a DBC area of 39×28 mm. The housing itself relies on a 17 mm mounting height with integrated clip-in functions as mechanical support to avoid redundant mechanical stand-alone parts on the heat sink. To avoid pin stress caused by vibration, a defined mechanical connection of PCB, power module and heat sink is required. The flow 0 housing concept ensures robustness regarding vibration stress and a stable thermal interfacing to the heat sink [see Mechanics and Electronics as Instrument for Minimized Drive Applications, Ralf Ehler, Michael Frisch, PCIM Europe Conference 2004].

A flexible pin terminal structure enables the realization of an application optimized pin-out, by not exceeding outer dimensions of about 66 mm×32.5 mm×17 mm, whereas PCB thicknesses of about 1.0, 1.5 or 2.0 mm respectively can be chosen.

Tradeoffs and limitations: The commuting time of course affects the PWM. Generally the current depending turn on delay has to be considered at the control part. In addition, the demagnetizing time limits the minimum turn on time to approximately 3% of the PWM cycle time.

Standard gate drivers cannot perform well, in particular, if they operate with a fixed dead time. Any dead time will add more turn on delay and is thus counterproductive to the recognized principle.

In course of realization of an example power module implementing the inventive converter, in order to reach better performance values and to achieve a defined and electrically isolated thermal interface to the inverter periphery in a further embodiment of the invention, a module technology has been selected. The power switches define the core-element within the application and significantly help to increase current density within the system as well as to decrease system cost at production volumes.

The inverter is operating at about 150-450 V level with about maximum 150 $A_{eff}$ phase current $I_{rms}$ per module. Up to 4 modules can be put in parallel, performing up to 600 $A_{eff}$ phase current. The maximum fundamental frequency sup-plied to the motor is specified to about 2000 Hz, which enables extremely high speed drives and also very high pole pair numbers. The chosen PWM frequency is set at 24 kHz, which leads to unusual low so-called additional hysteretic losses in the motor iron.

The module is realized on a DBC plate w/o a solid Cu-cooling plate. For a better thermal interface to the cooling medium AlN material was chosen. For applications with lower power demand, Al2O3 DBC can be equally selected, although the chip can't be used to its full extent in this case.

In the following several AlN version is discussed.

In an 600 V module, in order to achieve the required performance levels, the module contains for the main power bridge paralleled high speed IGBTs of the 2nd gen., designed for fast switching applications, with a given nominal current of up to 50 A each. The supporting transistors are single duos composed of 3rd gen. IGBTs and of high efficiency fast recovery diodes.

In an 1200 V module, the main power bridge contains Tyco's 'PhantomSpeed' IGBTs, a second generation transistor with extremely high switching speed capability with a given nominal current of up to 25 A each, whereas the support switches are composed of 3rd gen. low loss transistors. High efficiency Emcon diodes complete the circuit.

Three such modules represent a complete power kit of 40 kW continuous electrical power ($V_{DC}$=75% $V_{DCmax}$, $I_{AC}$=$I_{ACcont}$, cos φ=0.9). The integrated capacitors are SMD components, specified for the required power and voltage levels. An SMD thermistor is integrated as well.

By using the invention, the switching losses are substantially reduced. This permits significantly higher switching frequencies up to 50 kHz. Apart from lower switching losses, the switching process is much smoother and produces substantially less interfering radiation. The EMC measures are reduced thereby to a minimum.

Unusual small EMI filters and the low specific losses permit a very high power density. Moreover, there are applications for which high switching frequencies are compulsory. These are in particular high speed motors (up to 100,000 rpm) and multi pole motors for highest torques. In addition, inductors in power DC/DC converters which are usually quite large, heavy and expensive, can be substituted by much smaller types, when the inventive principles are used.

The converter according to the invention leads to significant benefits within the system at circuitry level but also at inverter level:

Circuitry Level:

Prevents the IGBTs from absorbing the reverse recovery charge when the load current commutes from the free wheeling diodes into the IGBT.

During turn off, the bridge capacitors prevent the IGBTs from high voltage as the tail current occurs.

Due to the absence of significant switching losses, the IGBTs can be utilized up to their rated DC-capability.

Ageing related to periodical thermal expansion of the dye, caused by adiabatic switching loss absorption is completely avoided.

The half bridges have proven extremely rugged and tolerant against overload.

Inverter Level:

Halves the required IGBT dye size at 25 kHz.

Allows the utilization of the body drain diode in high voltage MOSFET bridges.

Due to the absence of reverse recovery spikes it generates extremely low disturbance emissions. In particular, DC-link filtering against conducted emissions will be obsolete.

System Level:

The invention enables a significantly higher PWM frequency and thus sinusoidal motorcurrents up to 2 kHz and even more. This allows innovative, high power density motor concepts.

High PWM frequency reduces PWM related motor losses and contributes to energy savings.

Low du/dt reduces dielectric stress of the motor insulation and enhances thus reliability during the expected lifetime of the powered device.

Further Features:

Permits higher switching frequencies by minimized switching losses.

High switching frequencies permit new applications like high speed or multi pole motors, especially electrical excitation synchronic machines.

Clearly lower electromagnetic interferences (EMI) by slow switching slopes.

Little filter expenditure due to lower EMI.

Compact and light weight design due to low losses and small EMI filters.

Longer life span by lower component stress.

Noiseless power electronics by switching frequencies above the audible range.

The embodiments shown are just exemplary implementing modes of the invention and do not mean the limitation to the present invention.

What we claim is:

1. A zero-voltage switching power converter comprising:
    an inverter;
    a first pair of controllable switching devices configured as main switching devices;
    a second pair of controllable switching devices configured as auxiliary switching devices;
    said inverter containing a semi-bridge circuit, said semi-bridge circuit having an upper side, said upper side containing a first one of said first pair of controllable switching devices, said upper side containing a first one of said second pair of controllable switching devices;
    said semi-bridge circuit having a lower side, said lower side containing a second one of said first pair of controllable switching devices, said a lower side containing a second one of said second pair of controllable switching devices;
    said semi-bridge circuit having a bridge point, said bridge point connected to a converter output terminal;
    a first inductor connected in series with said first one of said second pair of controllable switching devices, said first inductor forming a first coil;
    a second inductor connected in series with said second one of said second pair of controllable switching devices, said second inductor forming a second coil; and,
    a common core on which said first and second coils are wound.

2. A zero-voltage switching power converter as claimed in claim 1, further comprising:
    a first drain for said first one of said second pair of controllable switching devices;
    a second drain for said second one of said second pair of controllable switching devices;
    said first inductor connected to said first drain, said second inductor connected to said second drain, said first and second inductors have distinctive stray inductances promoting at least nearly zero voltage switching-on and switching-off of said auxiliary switching devices;
    a first freewheeling diode in parallel to said first one of said second pair of controllable switching devices; and,
    a second freewheeling diode in parallel to said second one of said second pair of controllable switching devices.

3. A zero-voltage switching power converter as claimed in claim 1, further comprising:
    a first bridge capacitor in said upper side, said first bridge capacitor in parallel to said first one of said first pair of controllable switching devices;
    a second bridge capacitor in said lower side, said second bridge capacitor in parallel to said second one of said first pair of controllable switching devices; and,
    said first inductor, said second inductor, said first bridge capacitor, and said second bridge capacitor form a resonant inverter topology.

4. The zero-voltage switching power converter as claimed in claim 1, wherein:
    said first and second coils are wound unidirectionally.

5. The zero-voltage switching power converter as claimed in claim 1, wherein:
    said first and second coils are wound with a bifilar winding on said common core.

6. The zero-voltage switching power converter as claimed in claim 1, wherein:
    at least one of said controllable switching devices is an IGBT.

7. A zero-voltage switching power converter as claimed in claim 1, further comprising:
    a first drain for said first one of said second pair of controllable switching devices;
    a second drain for said second one of said second pair of controllable switching devices;
    said first inductor connected to said first drain, said second inductor connected to said second drain;
    a first diode in said upper side;
    said first diode having a first anode, said first anode connected between said first inductor and said first drain;
    a second diode in said lower side;
    said second diode having a second anode, said second anode connected between said second inductor and said second drain; and,
    said first diode having a first cathode, said second diode having a second cathode, said first and second cathodes being connected at a common connection; and,
    an auxiliary voltage output connected to said common connection.

8. A zero-voltage switching power converter as claimed in claim 1, further comprising:
    a demagnetizing third inductor wound on said common core and coupled with said first and second inductors;
    said third inductor having a first terminal, said third inductor having a second terminal;
    power terminals in said inverter;
    said first and second terminals of said third inductor each respectively connected to a respective power terminal; and,
    a first diode connecting said first terminal to its respective connected power terminal.

9. A zero-voltage switching power converter as claimed in claim 8, further comprising:
    a second diode connecting said second terminal to its respective connected power terminal.

10. A zero-voltage switching power converter as claimed in claim 8, further comprising:
    a second diode;
    said second diode connecting said second terminal to an auxiliary voltage output.

11. A zero-voltage switching power converter as claimed in claim 1, further comprising:
   a first freewheeling diode in parallel to said first one of said second pair of controllable switching devices;
   a second freewheeling diode in parallel to said second one of said second pair of controllable switching devices;
   a third freewheeling diode in parallel to said first one of said first pair of controllable switching devices; and,
   a fourth freewheeling diode in parallel to said second one of said first pair of controllable switching devices.

12. A zero-voltage switching power converter as claimed in claim 1, further comprising:
   power terminals in said inverter; and,
   a filter capacitor connected between said power terminals.

13. A zero-voltage switching power converter as claimed in claim 1, further comprising:
   connections configured to connect said inverter in control of an electrically excited synchronous machine.

14. A zero-voltage switching power converter as claimed in claim 1, further comprising:
   a power module configured to be received in a vehicle, said power module containing said inverter.

15. A zero-voltage switching power converter comprising:
   an inverter;
   a first pair of controllable switching devices configured as main switching devices;
   a second pair of controllable switching devices configured as auxiliary switching devices;
   said inverter containing a semi-bridge circuit, said semi-bridge circuit having an upper side, said upper side containing a first one of said first pair of controllable switching devices, said upper side containing a first one of said second pair of controllable switching devices;
   said semi-bridge circuit having a lower side, said lower side containing a second one of said first pair of controllable switching devices, said a lower side containing a second one of said second pair of controllable switching devices;
   said semi-bridge circuit having a bridge point, said bridge point connected to a converter output terminal;
   a first inductor connected in series with said first one of said second pair of controllable switching devices, said first inductor forming a first coil;
   a second inductor connected in series with said second one of said second pair of controllable switching devices, said second inductor forming a second coil;
   a common core on which said first and second coils are wound;
   a first drain for said first one of said second pair of controllable switching devices;
   a second drain for said second one of said second pair of controllable switching devices;
   said first inductor connected to said first drain, said second inductor connected to said second drain;
   a first diode in said upper side;
   said first diode having a first anode, said first anode connected between said first inductor and said first drain;
   a second diode in said lower side;
   said second diode having a second anode, said second anode connected between said second inductor and said second drain; and,
   said first diode having a first cathode, said second diode having a second cathode; and,
   an auxiliary voltage output connected to said cathodes.

16. A zero-voltage switching power converter as claimed in claim 15, further comprising:
   said first and second inductors configured with respective distinctive stray inductances promoting at least nearly zero voltage switching-on and switching-off of said auxiliary switching devices;
   a first freewheeling diode in parallel to said first one of said second pair of controllable switching devices; and,
   a second freewheeling diode in parallel to said second one of said second pair of controllable switching devices.

17. A zero-voltage switching power converter as claimed in claim 15, further comprising:
   a first bridge capacitor in said upper side, said first bridge capacitor in parallel to said first one of said first pair of controllable switching devices;
   a second bridge capacitor in said lower side, said second bridge capacitor in parallel to said second one of said first pair of controllable switching devices; and,
   said first inductor, said second inductor, said first bridge capacitor, and said second bridge capacitor form a resonant inverter topology.

18. The zero-voltage switching power converter as claimed in claim 15, wherein:
   said first and second coils are wound with a bifilar winding unidirectionally on said common core.

19. The zero-voltage switching power converter as claimed in claim 15, wherein:
   at least one of said controllable switching devices is an IGBT.

20. A zero-voltage switching power converter as claimed in claim 15, further comprising:
   a demagnetizing third inductor wound on said common core and coupled with said first and second inductors;
   said third inductor having a first terminal, said third inductor having a second terminal;
   power terminals in said inverter;
   said first and second terminals of said third inductor each respectively connected to a respective power terminal; and,
   a third diode connecting said first terminal to its respective connected power terminal.

21. A zero-voltage switching power converter as claimed in claim 20, further comprising:
   a fourth diode;
   said fourth diode connecting said second terminal to said auxiliary voltage output.

22. A zero-voltage switching power converter as claimed in claim 15, further comprising:
   a first freewheeling diode in parallel to said first one of said second pair of controllable switching devices;
   a second freewheeling diode in parallel to said second one of said second pair of controllable switching devices;
   a third freewheeling diode in parallel to said first one of said first pair of controllable switching devices; and,
   a fourth freewheeling diode in parallel to said second one of said first pair of controllable switching devices.

23. A zero-voltage switching power converter as claimed in claim 15, further comprising:
   power terminals in said inverter; and,
   a filter capacitor connected between said power terminals.

24. A zero-voltage switching power converter as claimed in claim 15, further comprising:
   connections configured to connect said inverter in control of an electrically excited synchronous machine.

25. A zero-voltage switching power converter as claimed in claim 15, further comprising:
a power module configured to be received in a vehicle, said power module containing said inverter.

26. A zero-voltage switching power converter comprising:
an inverter;
a first pair of controllable switching devices configured as main switching devices;
a second pair of controllable switching devices configured as auxiliary switching devices;
said inverter containing a semi-bridge circuit, said semi-bridge circuit having an upper side, said upper side containing a first one of said first pair of controllable switching devices, said upper side containing a first one of said second pair of controllable switching devices;
said semi-bridge circuit having a lower side, said lower side containing a second one of said first pair of controllable switching devices, said a lower side containing a second one of said second pair of controllable switching devices;
said semi-bridge circuit having a bridge point, said bridge point connected to a converter output terminal;
a first inductor connected in series with said first one of said second pair of controllable switching devices, said first inductor forming a first coil;
a second inductor connected in series with said second one of said second pair of controllable switching devices, said second inductor forming a second coil;
a common core on which said first and second coils are wound, said first and second coils being wound unidirectionally with a bifilar winding;
a first drain for said first one of said second pair of controllable switching devices;
a second drain for said second one of said second pair of controllable switching devices;
said first inductor connected to said first drain, said second inductor connected to said second drain, said first and second inductors have distinctive stray inductances promoting at least nearly zero voltage switching-on and switching-off of said auxiliary switching devices;
a first freewheeling diode in parallel to said first one of said second pair of controllable switching devices;
a second freewheeling diode in parallel to said second one of said second pair of controllable switching devices;
a third freewheeling diode in parallel to said first one of said first pair of controllable switching devices;
a fourth freewheeling diode in parallel to said second one of said first pair of controllable switching devices;
a first bridge capacitor in said upper side, said first bridge capacitor in parallel to said first one of said first pair of controllable switching devices;
a second bridge capacitor in said lower side, said second bridge capacitor in parallel to said second one of said first pair of controllable switching devices;
said first inductor, said second inductor, said first bridge capacitor, and said second bridge capacitor form a resonant inverter topology;
a demagnetizing third inductor wound on said common core and coupled with said first and second inductors;
said third inductor having a first terminal, said third inductor having a second terminal;
power terminals in said inverter;
said first and second terminals of said third inductor each respectively connected to a respective power terminal;
a first diode connecting said first terminal to its respective connected power terminal; and,
a second diode connecting said second terminal to its respective connected power terminal.

* * * * *